April 15, 1969  G. BELLEFEUILLE  3,438,594

MOTORIZED FISHING REEL

Filed May 13, 1965

INVENTOR
GEORGE BELLEFEUILLE

# United States Patent Office 3,438,594
Patented Apr. 15, 1969

3,438,594
MOTORIZED FISHING REEL
George Bellefeuille, 65 Dieppe Ave., Elliot Lake,
Ontario, Canada
Filed May 13, 1965, Ser. No. 455,572
Int. Cl. A01k 89/04, 89/00
U.S. Cl. 242—84.2       3 Claims

ABSTRACT OF THE DISCLOSURE

A closed-face, spinning reel in which the line can be selectively retrieved by; (1) rotating a rotor relative to an associated spool by crank operated gearing, or (2) the spool may be rotated by an electric motor connected to the spool by gearing.

This invention relates to reels for fishing rods, and more particularly to a motorized fishing reel for reeling in fishing line.

Among the many techniques used in fishing is that of trolling, wherein a bait is case and line drawn or reeled in slowly or steadily in order that the movement of the bait through the water simulates that of live bait. Generally speaking the line must be cast many times for each strike that is made; therefore it is common experience for a fisherman to reel in the line for considerable periods to no avail. To the present time this operation usually is carried out manually by turning a handle. While playing a fish may be considered a sport requiring skill, it is generally found to be monotonous simply to reel in the bait time after time.

An object of this invention, therefore, is to provide a motorized fishing reel for use on pleasure fishing rods automatically to reel in the fishing line.

Figure 1:
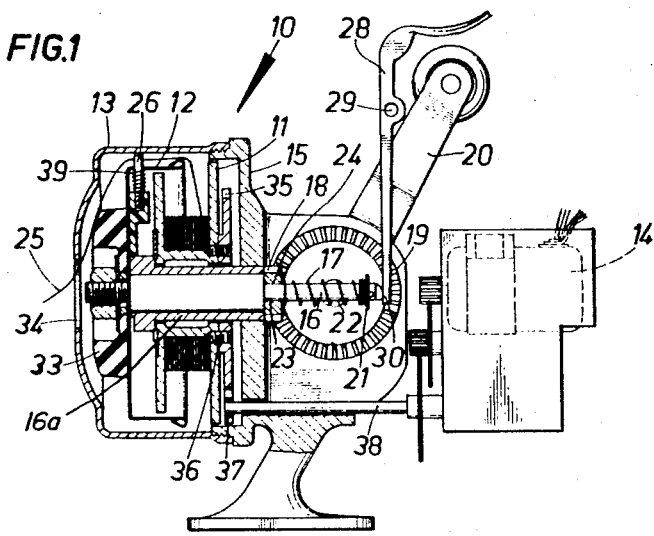

Other objects and advantages will become apparent from the following detailed description taken in conjunction with the drawings, wherein:

FIGURE 1 represents a midvertical sectional view of a preferred embodiment of this invention in the reeling in position.

Figure 2:
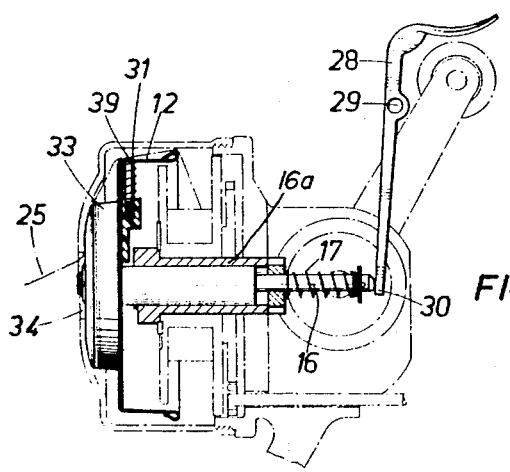

FIGURE 2 similarly represents a midvertical view of this invention in the full extended paying out position.

Figure 3:
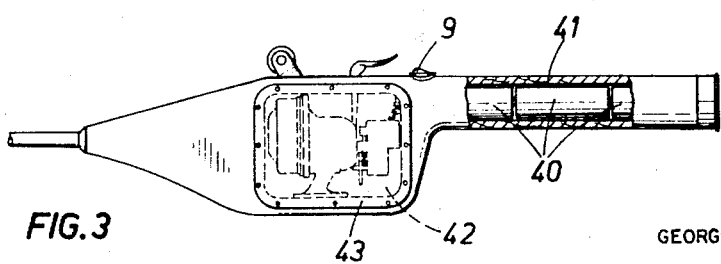

FIGURE 3 depicts an adapted form of fishing rod employing my motorized fishing reel.

Referring now to the drawings my motorized fishing reel, indicated generally by reference 10, comprises a conventional spool 11 and a rotor 12 within a housing or casing 13, the spool 11 being drivingly connected to an electric motor 14 by means described below. Referring especially to FIGURES 1 and 2, as in a conventional reel, the spool 11 is secured to a back plate 15 of the housing 13, and a rod 16 rotatably mounted in a bushing 16a fixed to the backplate 15, extends through both the back plate 15 and the spool 11 and has the rotor 12 mounted on its forward end. Manually operable drive means for the rod 16 is provided on a rearward extension of back plate 15 in the form of a pinion 18, driven by a ring gear 19 which is turned by a handle 20.

The rod 16 is provided with a circumposing spring 17 which is retained under compression upon the rear portion of the rod between a spring retainer cap 21 and the gear 18, to thereby maintain the rod 16 in the position depicted in FIGURE 1, when the rotor 12 is spaced axially apart from the housing 13. The rod 16 is of non-circular cross-section, being provided with a flat face 22 that engages an opposing interior flat face 23 of a bore 24 of the pinion 18, whereby axial movement of the rod is permitted through pinion 18, to the position depicted in FIGURE 2, while at the same time rotation of the pinion 18 produces positive rotation of the rod 16. Upon rotation of the handle 20, therefore, the rotor 12 is turned and line 25 is engaged in known manner by a pin 26 to wind in the line upon the spool, the spool remaining stationary since it is attached to back plate 15, as previously described.

FIGURE 2 indicates the relative position of the reel components in the extended "paying out" position. In order to make a cast in the usual manner a release lever 28, which is pivotally mounted on the fishing rod at a pivot 29 on a bracket (not illustrated) extending from the rod, is pushed downwardly by the thumb, whereupon the end 30 thereof forces the rod 16 forward against the action of the spring 17, producing corresponding forward movement of the rotor 12. The pin 26 is moved from its extended position by the action of a spring 39 to the withdrawn position indicated by reference numeral 31, thereby permitting the line 25 to be unwound from the spool 11. A braking action upon the line is achieved by means of a rubber disk member 33 secured to rotor 12, which disk is moved against the interior face of the housing 13, as depicted in FIGURE 2, to permit control by the fisherman pressing upon the lever 28 of the rate at which line 25 can be pulled through opening 34 by a fish swimming away from the fisherman.

As handle 20 is again turned, the lever 28 of course being released, the rotor 12 again rotates, and the pin 26 is re-extended to the engaged position to thereby wind in line 25.

The above has been a brief account only of the essential workings of the reel in conventional manner. It is apparent from the account given that spool 11 is stationary throughout and serves merely as a line receiving means.

In a motorized fishing reel in accordance with my invention, a spur gear 35 is mounted upon and secured to the spool 11 by means of screws 36, the gear 35 being in meshed engagement with a driving spur gear 37 mounted upon a drive rod 38 of electric motor 14. Upon the completion of an electric circuit to the motor from a power source constituted by batteries 40 through conventional switch or push button means the spool 11 is rotated upon the bushing 16a independently of the action of the manual control means already herein described. Though many switch means may be found, I prefer to adapt and employ the type of switch commonly found on flash lights, indicated by reference numeral 9 in FIGURE 3. Moreover, I have found that the batteries 40 may be conveniently housed within a hollow handle 41 of the fishing rod. The complete motorized fishing reel may be installed in a substantially waterproof compartment 42 of the rod, as illustrated, a removable panel 43 being provided to permit access for purposes of maintenance or repair to motor 14 or the various reel components.

It will be apparent to those skilled in the art that various changes and modifications may be made in the invention without departing from the spirit and scope thereof, and therefore this invention is not limited by that which is shown in the drawing or described in the specification, but only as indicated in the appended claims.

I claim:

1. In a fishing reel intended for either manual or motor driven operation, a fishing rod handle; a casing carried by the handle and having a back plate; a bushing mounted on said back plate and extending into said casing; a spool rotatably mounted on said bushing; a rotor in said casing, a line-engaging pin mounted by said rotor for movement between an extended operative position and a retracted inoperative position, said rotor and said pin in operative position cooperating with said spool to wind a line thereon when said rotor is rotated, a rod extending through said bushing and drivably connected to said rotor; said rod being axially shiftable in said bushing; a manually-operated brake means for said motor; a manually operable handle mounted on said fishing rod handle; gear means establishing a driving connection between said manually operable handle and said rod whereby the rod and the rotor are rotated by operation of the handle for reeling in the line; manually operated means operable to shift said rod axially to cause retraction of said pin; a first spur gear drivably mounted on and rotatable with said spool; a second spur gear meshing with said first spur gear; an electric motor including gear means carried by said fishing rod handle rearward of said casing, and connecting shaft means connecting said motor gear means to said second spur gear whereby operation of said motor rotates said reel for reeling in the line; batteries in said fishing rod handle powering said motor; and an electric switch on said fishing rod handle controlling operation of said motor.

2. A reel as claimed in claim 1, wherein said brake means comprises a member carried by said rotor and engageable with said casing upon said axial movement of the said rod and corresponding axial movement of the rotor.

3. A reel as claimed in claim 1, wherein the said motor and motor gear means are mounted on the handle to the rear of the said casing and the said manually operable handle, the said first spur gear is coaxial with the spool, and the said connecting shaft means extending from said gear means to said second spur gear are rotatable about an axis parallel to the axis of rotation of the said rod.

References Cited

UNITED STATES PATENTS

| | | | |
|---|---|---|---|
| 2,743,067 | 4/1956 | Stratton. | |
| 2,866,291 | 12/1958 | Duell | 43—21 |
| 2,896,875 | 7/1959 | Reed et al. | 242—84.1 X |
| 2,989,266 | 6/1961 | Yeada | 242—84.2 |
| 3,017,134 | 1/1962 | Duvall | 242—84.1 X |
| 3,059,872 | 10/1962 | Griffis | 242—84.2 |
| 3,248,819 | 5/1966 | Stealy | 43—21 |

FOREIGN PATENTS 8,033   6/1961   Japan.

BILLY S. TAYLOR, *Primary Examiner.*

U.S. Cl. X.R.

43—21